United States Patent

Everaerts et al.

Patent Number: 5,283,092
Date of Patent: Feb. 1, 1994

[54] IMAGING MANIFOLD

[75] Inventors: Albert I. Everaerts, Oakdale; Jeffrey D. Malmer, North St. Paul, both of Minn.; Michael J. Louis, Cedar Park, Tex.

[73] Assignee: Minnesota Mining and Manufacturing Company, St. Paul, Minn.

[21] Appl. No.: 816,637

[22] Filed: Dec. 31, 1991

[51] Int. Cl.$^5$ .................. C08F 265/06; C09J 133/00; G03G 7/00

[52] U.S. Cl. .......................... 428/40; 428/200; 428/201; 428/202; 428/203; 428/204; 428/345; 428/354; 428/355; 428/480; 428/483; 428/520; 428/522; 462/8; 462/62; 462/900; 462/901; 526/328; 526/328.5; 526/329.6; 526/329.7

[58] Field of Search .............. 428/40, 355, 343, 345, 428/354, 520, 522, 352, 349, 195, 480, 483, 200, 201–204; 427/208.4, 208.6; 526/328, 328.5, 329.6, 935, 329.7; 462/8, 66, 900, 901; 503/227

[56] References Cited

U.S. PATENT DOCUMENTS

| | | | |
|---|---|---|---|
| 3,691,140 | 9/1972 | Silver | 260/78.5 |
| 3,707,518 | 12/1972 | Bemmels et al. | 260/29.6 |
| 3,900,674 | 8/1974 | Coffman | 428/355 |
| 3,983,297 | 9/1976 | Ono et al. | 428/355 |
| 4,038,454 | 7/1977 | Lehmann | 428/355 |
| 4,074,004 | 2/1978 | Bateson | 428/355 |
| 4,104,067 | 8/1978 | Krafft | 428/355 |
| 4,166,152 | 8/1979 | Baker et al. | 428/522 |
| 4,201,808 | 5/1980 | Cully et al. | 428/40 |
| 4,312,916 | 1/1982 | Kakumaru | 428/355 |
| 4,404,246 | 9/1983 | Charbonneau | 428/355 |
| 4,599,265 | 7/1986 | Esmay | 428/355 |
| 4,737,559 | 4/1988 | Kellen | 526/292.3 |
| 5,073,611 | 12/1991 | Rehmer et al. | 526/208 |
| 5,156,911 | 10/1992 | Stewart | 428/355 |

FOREIGN PATENT DOCUMENTS

| | | |
|---|---|---|
| 0052938 | 6/1982 | European Pat. Off. |
| 0109177 | 5/1984 | European Pat. Off. |
| 0121430 | 10/1984 | European Pat. Off. |
| 3935097A1 | 4/1991 | Fed. Rep. of Germany |
| 2356706 | 1/1978 | France |
| 2256815A | 12/1992 | United Kingdom |
| WO90/13420 | 11/1990 | World Int. Prop. O. |
| WO91/18739 | 12/1991 | World Int. Prop. O. |

OTHER PUBLICATIONS

International Search Report PCT/US92/11156.
International Search Report PCT/US92/10776.
International Search Report PCT/US92/11010.
Chemical Abstracts, vol. 84, No. 24, Jun. 14, 1976, Columbus, Ohio, US Abstract No. 154830t, T. Norio "*Adhesive Compositions*" p. 50, col. 1; and JP,A,41 006 234 (Pentel) Jan. 19, 1976.

Primary Examiner—Ellis P. Robinson
Assistant Examiner—Nasser Ahmad
Attorney, Agent, or Firm—Gary L. Griswold; Walter N. Kirn; Robert W. Sprague

[57] ABSTRACT

This invention relates to an imaging sheet manifold comprising a transparent polymeric sheet imageable in an imaging machine and an opaque sheet adhered thereto by means of a removable pressure-sensitive adhesive. The adhesive comprises a) 50–90% by weight of a lower alkylacrylate the alkyl chains of which can be from 4–12 carbon atoms; b) 10–50% by weight of a higher alkylacrylate or methacrylate, the alkyl chains of which can be from 12 to 26 carbon atoms, and c) a crosslinker. This invention also comprises a method of making the novel imaging manifold.

12 Claims, 1 Drawing Sheet

5,283,092

IMAGING MANIFOLD

FIELD OF INVENTION

This invention relates to a transparent imaging sheet for use in electrostatic imaging machines. More particularly, the present invention relates to an imaging manifold comprising a transparent sheet and an opaque member adhered thereto by means of a removable pressure sensitive adhesive.

BACKGROUND OF THE INVENTION

Transparencies for the projection of light images are well known and can be formed from a transparent film base and an image or print applied thereto by an electrostatic copying process. Electrostatic copying machines are well known and generally employ sophisticated mechanisms allowing them to select imaging sheets from a stack of sheets and by the use of rollers, wheels, belts, and the like, to cause such sheets to rapidly and precisely be moved past various points in the machine during the imaging process, producing a great number of copies in a relatively short time span. Such sophisticated mechanisms include sensing devices to prevent damage to the machine if wrinkling, tearing or other deformation of the sheets occurs. For example, these sensing devices will halt operation of the machine if jamming occurs so as to avoid damage. Many of these sensing mechanisms employ photosensors which monitor the passage of the sheet through the machine. In order for such sensing mechanisms to function, the sheets need to be opaque in certain areas so as to interrupt the light beams employed in the photosensing mechanisms. Accordingly, when transparent sheet materials are used in these copying machines, they need to be rendered opaque in selected areas to operate properly in the copier.

Some copying machines require that only a small portion of the transparent sheet be rendered opaque and therefore the printing of a dark line along the top or side of such sheets is sufficient. Other machines require that a greater area of the sheet be rendered opaque or that prime image areas of the sheet be opaque. Obviously, this situation precludes the use of a transparent sheet with an unobtrusive opaque line printed along one edge.

One method of rendering a sheet opaque is by making imaging manifolds which comprise a transparent sheet and an opaque backing member generally adhered thereto by means of an adhesive. U.S. Pat. No. 3,618,752 discloses a stack of image receiving members, each being in contact with adjacent members. Each image members includes a generally rectangular, transparent, non-fibrous, flexible sheet, and a sheet of paper backing, substantially coextensive and in register with the non-fibrous transparent sheet, secured to the transparent sheet along a common leading edge or along either side edge alone or in a combination of the two. Generally, the paper sheet is adhered to the transparent sheet by a thin line of adhesive proximate a common edge of the mated sheets. The paper sheet can also be applied by other securing methods such as stapling and glueing. Optionally, the transparent sheet may be creased or scored so that when the transparent sheet has been imaged, the operator can tear the paper sheet from the transparent sheet and discard the paper sheet to leave a clean transparency.

The attachment of such paper backing sheets with an adhesive line has not provided a satisfactory imaging manifold without the use of scored or creased lines. When the paper sheet is torn from the transparent sheet, visible paper fibers usually remain on the transparent sheet in the area of the adhesive bond. When a discontinuous adhesive bond is used, for example a "dashed" adhesive line, the amount of paper fibers remaining on the transparent sheet following removal of the paper sheet is somewhat reduced. However, a more serious problem can develop in that such composite sheets have a greater tendency to jam in the feed mechanism of the copy machines.

EP0052938 Patent Specification discloses an imaging manifold comprising a transparent imaging sheet imageable in a copying machine, an opaque paper sheet underlying and in register with the transparent sheet, and an adhesive composition interposed between and bonding the paper backing sheet to the transparent sheet having peel strength less than the tear strength of the paper backing. The adhesive has a greater affinity for the surface of the paper backing than for the surface of the transparent sheet. Moreover, the adhesive is further characterized to have greater affinity for itself than for the surface of the transparent sheet. This careful balancing of adhesive properties allows the paper sheet to be peeled from the transparent sheet without leaving a visible paper residue on the transparent sheet, and without leaving any substantial adhesive residue on the transparent sheet. Further, since the sheets of the manifold are preferably joined by a continuous line of adhesive, it has less tendency to jam in the feed mechanism of the copier.

A number of adhesives are taught which provide the characteristics noted above. These include natural rubber or synthetic rubber adhesives. Other suitable synthetic polymeric adhesives include vinylacetate polymers, and ester-modified vinylacetate polymers, isooctyl acrylate/acrylamide copolymers in combination with a release agent such as a urethane based polyvinyl alcohol and octadecyl isocyanate, ethylene/vinylacetate copolymer hot-melt adhesives, and adhesives based on tacky, elastomeric, microspheres of the type disclosed in U.S. Pat. No. 3,691,140 and 4,166,152. These cited microsphere type adhesives are particularly suitable for imaging manifolds because of their noted removability from a large number of surfaces with no paper tearing.

U.S. Pat. No. 4,599,265 discloses another removable adhesive comprising a radiation cured composition comprising low levels of polar monomers, copolymerized with alkylacrylates having from about 8 to 12 carbon atoms, and crosslinked to provide removability.

The above-mentioned removable adhesives are generally either solvent based or water based and are generally not amenable to on-line processing of the entire imaging manifold because of the complicated coating and drying processes involved in manufacturing imaging manifolds. In addition, radiation cured adhesives require an inert atmosphere for curing and cannot be cured at high line speeds. In traditional off-line processes, the backing sheet is usually coated with an adhesive at a separate and different area than where the transparent sheet is made. Because the adhesive is coated at a different location, there is a need for it to be transported as a stock roll. Therefore, the backing sheet is coated with a low adhesion backsize coating to facilitate the unwinding thereof.

Another drawback with traditional radiation processes is that the monomeric adhesive compositions coated onto backings such as paper tend to bleed into the paper causing the paper to deteriorate.

Hot melt adhesives are generally less complicated to process and therefore more amenable to on-line processing. However, most known hot-melt adhesives require high processing temperatures. Therefore, the adhesive used in hot melt processing needs to be cooled prior to being combined with the transparent imaging film.

The present invention overcomes the problems discussed above with a new class of hot-melt coatable removable pressure sensitive adhesive suitable for use in an imaging manifold.

SUMMARY OF THE INVENTION

The present invention relates to a transparent imaging manifold capable of being used in imaging devices such as copying or printing machines. The imaging manifold comprises:
 a. a transparent, polymeric sheet imageable in an imaging device;
 b. an opaque backing sheet underlying and in register with said transparent sheet, and
 c. a removable adhesive composition adhering said opaque backing sheet to said transparent polymeric sheet.

The adhesive of the present invention has a low melt viscosity which allows hot melt processing under low temperature conditions. Furthermore, the adhesive of the present invention allows the removal of the opaque sheet without paper tear or substantial adhesive transfer. Unless otherwise noted, the term "acrylate" is intended to refer to methacrylate in addition to acrylate. The adhesive comprises:
 1) from about 50 to about 90% by weight of at least one lower alkyl acrylate having an alkyl group comprising from 4 to 12 carbon atoms, and
 2) from about 10 to about 50% by weight of at least one higher alkyl acrylate having an alkyl group comprising from 12 to 26 carbon atoms,
wherein said lower and upper alkyl acrylates cannot simultaneously have alkyl groups of 12 carbon atoms. Preferably, the alkyl group of the higher alkyl acrylate has alkyl groups from about 13 to about 18 carbon atoms.

A sufficient amount of photocrosslinker is added to improve the cohesive strength of the adhesive in order to prevent substantial adhesive transfer to the polymeric sheet. Preferably, the photocrosslinker comprises from about 0.05 to about 1% by weight of the adhesive composition.

The adhesive used in the present invention has high cohesive strength, high tack and high peel strength along with good removability. The adhesive further possesses low melt viscosity and can easily be used as a hot-melt adhesive thereby allowing its use in the on-line formation of imaging manifolds. The adhesive composition has a greater adhesive affinity for the surface of the opaque backing sheet than for the other elements of the manifold, i.e., either the transparent sheet or the adhesive itself, so that after removal, there is no residue left on the transparent sheet and no ghosting appears on a screen when the transparent sheet is projected using an overhead projector.

Additionally, the adhesive can be colored with any colorant that will not interfere with the photocrosslinkers when present.

The present invention also includes the method of making transparent imaging manifolds. The method comprises the following steps:
 a. extruding a continuous bead of the adhesive along at least one edge of one surface of an opaque backing sheet;
 b. mating the opaque backing sheet with the adhesive layer and a transparent sheet having one image receiving surface on the surface opposite the image receiving surface.

The method of making transparent imaging manifolds also includes the step of coating an image receiving layer on the image receiving surface of the transparent film sheet and then drying the image receiving layer prior to mating the opaque backing with the adhesive layer.

DETAILED DESCRIPTION OF THE INVENTION

Figures 1, 2:
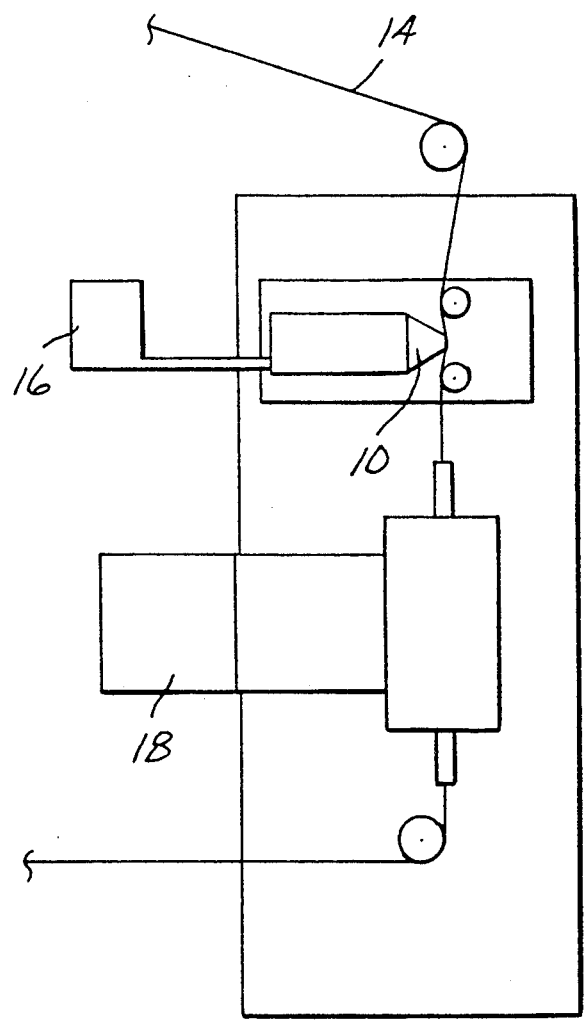
FIG. 1 is a top plan view of an apparatus used in applying adhesive to opaque sheet backing.
FIG. 2 is a cross-sectional view of a shim used to apply adhesive in the apparatus shown in FIG. 1.

The transparent imaging manifold of the present invention comprises a polymeric sheet, an opaque backing and a removable adhesive composition.

The polymeric sheet of the present invention can comprise a transparent film. If desired, the sheet can be made of one or more layers of transparent film. Useful transparent polymeric film include heat-resistant materials such as polyester, e.g., polyethylene terephthalate, polymethyl methacrylate; cellulose triacetate; polyethylene, polypropylene; polystyrene film; polyvinylidene fluoride; polyvinyl chloride; polyamides and polyimides and combinations thereof. Such films are widely commercially available. For example, the film sold by ICI under the tradename Melinex is suitable as is the film sold by E.I. DuPont de Nemours (DuPont) sold under the commercial trade name Mylar.

The film substrate should have a thickness from about 50 $\mu$m to about 150 $\mu$m although substrates outside this range can also be used. Preferably, the film substrate thickness should be from about 75 micrometers to about 150 micrometers.

If higher toner adhesion is desired, one surface of the transparent polymeric sheet can be coated with any suitable image receptive layer. The composition of the receptive layer can be any found in commercially available imaging transparent films and include cellulose acetate and hydrolyzed cellulose acetate, carboxymethyl cellulose, polyethylene oxide, polyvinylchloride, polyvinylidine fluoride, polycaprolactone, polymethylmethacrylate, polyacrylates and combinations of the above.

The opaque backing sheet useful in the imaging manifold of the invention can be selected from a wide variety of films and paper materials including opaque polymeric sheets, paper-like porous opaque polymeric sheets and calendered paper. Paper-like opaque polymeric sheets and machine glazed paper are preferred. Opaque backing sheets should have good dimensional stability and exhibit good resistance to heat in order to resist wrinkling as the backing sheets pass through the imaging device. In choosing an opaque backing, the type of copying or printing machine used by the user should be considered.

In order to adhere the opaque backing to the polymeric sheet, an adhesive is placed on the backing prior to mating the backing with the transparent film. The adhesive used in the present invention has high cohesive strength, high tack and high peel strength while maintaining good removability. Generally, the adhesive is formulated to have a greater affinity for the surface of the opaque sheet than for the transparent imaging sheet so that after removal, there is no residue left on the transparent sheet and no ghosting appears on a screen when the transparent sheet is projected using an overhead projector.

The adhesive composition of the present invention comprises from about 50-90% by weight of a lower alkyl acrylate having alkyl groups from 4 to 12 carbon atoms and from about 10-50% by weight of a higher alkyl acrylate or methacrylate having carbon groups from 12 to 26 carbon atoms. Preferably, the adhesive composition comprises a lower alkyl acrylate from about 60-80% by weight and from about from about 20-40% by weight of a higher alkyl acrylate or methacrylate.

The lower alkyl acrylates can be either linear or branched. If the alkyl group is linear it is preferred that it comprise from about 4 to 8 carbons and if it is branched it is preferred that it comprise from 4 to 12 carbon atoms. When alkyl acrylates such as methyl or ethyl acrylate are used, reduced tack and reduced immediate peel adhesion are observed. In addition, adhesion build up is observed. The preferred lower alkyl acrylates include n-butylacrylate, 2-ethylhexyl acrylate and isooctylacrylate.

The higher alkyl acrylates can be either linear or branched chain acrylates or methacrylates, preferably having from about 12 carbon to about 26 carbon atoms. Preferred higher alkyl acrylates include n-octadecylacrylate and n-octadecylmethacrylate.

Adhesive compositions suitable for a removable, nonghosting tab application for transparencies are preferably copolymerized with small amounts of photocrosslinkers. Preferably, ultraviolet light (UV) activated crosslinkers are used. These UV crosslinkers which increase the cohesive strength of the adhesive should be present in an amount from 0.05% weight to 1.0% by weight. More preferably, the UV crosslinkers should be present in amounts from 0.2% to 0.4% by weight. Suitable curing agents include benzophenones and monoethylenically unsaturated aromatic ketones such as acryloyl-oxybenzophenone as described U.S. Pat. No. 4,737,559 (Kellen et al.) which is herein incorporated by reference. A preferred mono-ethylenically unsaturated aromatic ketone is 4-acryloyl-oxy-benzophenone. Other suitable crosslinkers include chromophore-substituted halomethyl-s-triazines disclosed in U.S. Pat. No. 4,329,384 (Vesley et al.) and U.S. Pat. No. 4,379,201 (Vesley).

The adhesive composition of the present invention can be colored by a variety of colorants such as dyes and pigments which can be mixed with the solid adhesive polymer. Any type of colorant can be used as long as it does not interfere with the photocrosslinkers. The colorant can be mixed prior to hot melt coating or it can be mixed during the initial processing of the adhesive polymer. A preferred colorant is a 1;2 cobalt complex sold under the trade name Intraplast Red GC by Crompton and Knowles Corp.

The adhesive can be polymerized using any solution polymerization method. However, the following procedure is preferred. The monomers along with solvent and the UV crosslinker are charged into a four neck reaction vessel which is equipped with a stirrer, a thermometer, a condenser, addition funnel and a thermowatch. After the monomer is charged into the reaction vessel, a thermal initiator solution is added to the addition funnel. The whole reaction vessel with its contents are then purged with nitrogen or argon to create an inert atmosphere. Once purged, the initiator is added and the solution within the vessel is heated to about 55° C. for about 20 hours. Next, the solvent is stripped by any conventional means. One means of stripping includes applying the coating onto a siliconeized release liner and then heating the coating until all the solvent evaporates leaving an adhesive product in solid form ready for hot melt coating.

Because it possesses low melt viscosity, the adhesive can be applied to the opaque backing via hot melt processing. In addition to possessing low melt viscosity, the adhesive possesses high shear thinning properties, high shear thinning being defined as a reversible decrease in viscosity with increasing shear rate. The high shear thinning characteristic combined with low melt viscosity properties make it suitable for low temperature hot melt coating using any commercially available hot melt equipment.

Referring to FIG. 1, machinery may be added onto existing transparency making equipment to produce the entire imaging manifold in an integrated process because of the ease of hot melt coatability. More specifically, a small capacity piston coater can be added to existing machinery to coat small quantities of adhesive onto an opaque backing. If larger quantities of hot melt are desired, a Nordson Serial 3400 melt applicator can be used.

In either case, the coater utilizes a narrow slot die nozzle 10 with a shim 12 (as shown in FIG. 2) to coat the adhesive onto an opaque backing 14. The thickness of the applied coating is controlled by a pressure manifold 16. Once the adhesive has been coated onto the opaque backing 14, a UV light source 18 cures the adhesive. It has been found that optimal results have been obtained by processing the opaque backings at speeds between 3 to 200 meters/minute although other speeds can be used depending upon the amount of adhesive to be applied. The opaque backing 14 is then mated with the transparent sheet to form an imaging manifold.

The amount of adhesive applied to the backing depends upon the width and thickness of the desired adhesive strip to be applied to the opaque backing. The width and thickness of the strip can be varied by the choice of slot die nozzle 10 and the speed that the adhesive is coated onto the backing 14. Variations in the width and thickness of the adhesive strip change the adhesive properties of the adhesive layer. Preferably, the thickness of the adhesive strip ranges from about 2.5 micrometers to about 50 micrometers and more preferably, from about 5 micrometers to about 30 micrometers. The width of the adhesive strip can be any width desired by the user. Preferably, the width of the adhesive strip ranges from about 1 millimeter to about 10 millimeters and more preferably, from about 2 millimeters to about 5 millimeters.

In general, the total peel adhesion of the adhesive strip from the transparent sheet should range from about 5 grams per width stated in the preferable ranges in the paragraph above up to a value where the opaque backing sheet is easily removed from the transparent sheet after imaging without creasing or scoring. These ranges are desired so that the resulting imaging manifold made by combining the backing 14 with a transparent sheet is easily fed into a imaging device and so that there is no jamming in the imaging device.

Depending upon user preference, the adhesive strip can be applied as a continuous strip onto the backing 14 or it can be applied in a discontinuous pattern, e.g., a dot pattern. Any pattern is suitable as long as the peel falls within the specified range. Optionally, two parallel strips of adhesive can be coated onto an opaque backing thereby allowing the production of two adhesive coated opaque backing sheets after the initial sheet fed through the above described process is slit in half.

The adhesive strip can be coated along the leading edge of the opaque backing 14 or along at least one side edge of the backing or combinations thereof.

In some cases, two opaque backings are mated with one transparent imaging sheet. The two opaque backings are generally attached to the transparent imaging sheet along the parallel side edges. The two opaque sheets can cover the whole transparent sheet, or they can be combined to leave a transparent window.

Testing

A number of tests were performed to characterize the performance of the adhesive of the present invention.

PEEL ADHESION

Peel adhesion is the force necessary to remove a coated opaque backing from a transparent film measured at a specific angle and rate of removal. In this case, peel adhesion was measured on a sample made by hot melting coating the leading edges of a paper backing sheet (30 pounds machine-glazed bone paper). The coated backing sheet was then mated with a transparent imaging sheet with the adhesive strip in contact with the surface opposite the imaging side of the transparent sheet. The peel adhesion was measured by attaching a free end of the backing to an I-mass machine and moving the backing away at a speed of 30 cm./min at an angle of 180°. The resultant force was measured in grams.

ADHESIVE TRANSFER

Adhesive transfer is the transfer of the adhesive to a contact surface. Samples were prepared in accordance with the procedures outlined in the peel adhesion test except that the paper backing was removed by hand from the transparent film. After removal, visual observation of the film surface was made and a qualitative scale of 1 to 4 was used to grade the adhesive transfer:
1. good—samples that are removed from test substrate leave no adhesive residue;
2. acceptable—samples that are removed from test substrate leave some residue evidenced by very slight ghosting when sample is projected;
3. borderline—samples that are removed from test substrate leave residue evidenced by some ghosting on overhead projection; and
4 unacceptable—ghosting on overhead projection.

REMOVABILITY

Removability is a test which considers whether the adhesive of the present invention is cleanly removable from a test substrate without causing any damage to the test substrate over a range of peel rates and varied periods of dwell, both at room temperature and at 60° C.

A strip of 0.127 dm in width of the sheet coated with the adhesive to be tested is applied to the horizontal surface of a polyester, treated polyester or paper test substrate with at least 1.27 lineal dm in firm contact. Three passes in each direction with a 2 kg hard rubber roller are used to apply the strip. If air bubbles are entrapped between the test substrate and the test strip, the sample is discarded. After one day or one week dwell, the free end of the coated strip is doubled back nearly touching itself so the angle of removal is about 135°. The free end is then pulled by hand at varying peel rates. The removability and peel force are judged according to the following ratings:

good—samples that are removed from the test substrate without damaging or leaving residue on the test substrate and which also exhibit good peel force over a range of peel rates;

aggressive—samples that are removed from the test substrate without damaging or leaving residue on the test substrate, but which can only be removed from the test substrate at a slow peel rate;

raspy—samples that are removed from the test substrate without damaging or leaving residue on the test substrate, but which are too stiff to be removed smoothly;

tear—samples that display too high a peel adhesion to the test substrate, causing the test substrate to tear or delaminate at any peel rate;

ghost—samples that leave a very thin, non-tacky residue on the test substrate when removed from the polyester and treated polyester samples; and weak—samples that have low tack and low peel Abbreviations and Tradenames AA—acrylic acid
ABP—4-acryloyl-oxy-benzophenone
ACM—acrylamide
BA—n-butyl acrylate
IOA—isooctylacrylate
NVP—N-vinyl pyrollidone
LMA—lauryl methacrylate
OA—n-octylacrylate
OAcM—n-octylacrylamide
ODA—octadecylacrylate
ODMA—octadecylmethacrylate
VAZO 64—2,2'azobis(isobutyronitrile) sold by DuPont

EXAMPLE 1

An imaging manifold of the present invention was made in the following manner:

70 grams of isooctylacrylate (IOA), 30 grams of octadecylacrylate (ODA), 0.3 grams of azo-isobutyronitrile (available as VAZO64 from DuPont) and, 0.20 grams of 4-acryloyl-oxy-benzophenone (ABP), (70/30/0.3/0.2 IOA/ODA/VAZO/ABP) and 150 grams of ethylacetate were charged into a 4-neck reaction vessel, equipped with a stirrer, a thermometer, condensor and thermowatch. The contents of the reaction vessel were purged with nitrogen to create an inert atmosphere. Then the solution was heated to about 55°

C. and maintained at that temperature for about 20 hours. The resultant solution was coated onto a siliconized release liner and oven dried at 65° C. for 15 minutes. The polymer in solid form was removed from the liner and ready for hot melt coating.

Next, the solid polymer was placed into a small capacity piston coater, heated to 170° C. and coated onto a roll of 30 pound machine-glazed bond paper stock (available from Simpson Paper Company) along one side edge at 12.5 mm away from the edge, at a speed of 150 meters/min., producing a stripe of adhesive approximately 2.5 cm wide and 12.5 μm thick. The striped roll was then passed three times under UV light (PPG UV processor equipped with medium pressure mercury lamps at 300 Watts/2.5 cm) at 25 meters/min. It was then mated with a roll of transparency stock made of 100 mm polyester terephthalate (PET) film. After slitting, the samples were tested for 180° peel adhesion and adhesive transfer according to the methods cited above and the results are reported in Table 1.

EXAMPLE 2

Example 2 was made in the same manner as in Example 1 except that the 100 mm thick PET film's imaging surface was coated with an image receptive coating of polymethylmethacrylate, ureaformaldehyde particles and antistatic agents (available as PP2500 from Minnesota Mining and Manufacturing Company).

The samples were tested as in Example 1 and the results are also shown in Table 1.

EXAMPLE 3

Example 3 was also made in the same manner as in Example 1 except that the imaging surface of the 100 mm thick PET film was coated with a hydrolyzed cellulose acetate layer (available as CG3120 from Minnesota Mining and Manufacturing Company). The results are shown in Table 1.

hot melt coated at 160° C. at 25 mm wide and 12.5 μm thick. The results are reported in Table 2.

EXAMPLES 6-8

Examples 6-8 were made in accordance with the procedure outlined in Example 1 except that the adhesive polymerization was carried out in a large capacity reactor with the following charge:

| | |
|---|---|
| IOA | 101.7 kg |
| ODA | 43.6 kg |
| ethylacetate | 218 kg |
| ABP | 290 g |
| VAZ064 | 290 g |

Prior to heating the reaction vessel to about 55° C., the reaction vessel was pumped with nitrogen to create an inert atmosphere. The mixture was agitated at 80 rpm. Two hours after initition, a second batch of 145 g of VAZ064 in 1800 g of ethylacetate was added to the sealed reaction vessel. Next, the agitation was increased to 120 rpm. After 20 hours, the polymer thus obtained had about 97 percent conversion. It was then dried using a filmtruder sold by LUWA which had been preheated to 450° F. A vacuum was maintained inside the filmtruder while the polymer was pumped through the filmtruder. The hot melt coater used for this large polymer batch was a Nordson Series 3400 melt applicator fitted with a narrow slot die nozzle unit as shown in FIG. 2 at a temperature of ~150° C. The shim which was 75 micrometers thick and had a 10 mm gap so that a coating of about 9.6mm could be applied to a roll of 30 pound machine-glazed bond paper. The thickness of the coating was varied from about 50 μm in Example 6, to about 12.5 μm in Example 7 and to about 5 μm in Example 8. After slitting, two identical rolls of samples were generated with one coating trip. Samples were tested and the results are shown in Table 2.

TABLE 2

| | Initial | | Aging | | | | | | | |
|---|---|---|---|---|---|---|---|---|---|---|
| | | | 2 weeks | | | | 5 months | | | |
| | | | 180° Peel (g) | | Adhesive Transfer | | 180° Peel (g) | | Adhesive Transfer | |
| Examples | 180° Peel Adhesion (g) | Adhesive Transfer | 40° C./ 90% RH | 60° C./ 0% RH | 40° C./ 90% RH | 60° C./ 0% RH | 40° C./ 90% RH | 60° C./ 0% RH | 40° C./ 90% RH | 60° C./ 0% RH |
| 4 | 38 | 1 | 41 | 19 | 1 | 1 | 27 | 16 | 1 | 1 |
| 5 | 30 | 1 | 41 | 23 | 1 | 1 | 29 | 29 | 1 | 1 |
| 6 | 185 | 2 | — | — | — | — | — | — | — | — |
| 7 | 74 | 1 | — | — | — | — | — | — | — | — |
| 8 | 25 | 1 | — | — | — | — | — | — | — | — |

The samples that were aged for 5 months were aged for 2 weeks at the indicated humidities and then aged at ambient humidity. Peel Adhesion in Examples 4 and 5 was measured at a width of 25 mm and in Examples 6-8 at a width of 9.6 mm.

TABLE 1

| EXAMPLE | INITIAL | | 9 MONTH AMBIENT AGING | |
|---|---|---|---|---|
| | 180° Peel (g/2.5 cm) | Adhesive Transfer | 180° Peel (g/2.5 cm) | Adhesive Transfer |
| 1 | 59 | 2 | 96 | 1.7 |
| 2 | 71 | 2.2 | 106 | 2.5 |
| 3 | 65 | 2.2 | 66 | 1.8 |

EXAMPLE 4-5

Example 4-5 were made and tested in accordance with Example 1 except that the adhesive composition was changed to a mixture comprising 60 weight percent isooctylacrylate, 40 weight percent octyldecylacrylate and 0.3 weight percent ABP. The compositions were

EXAMPLES 9-13

Examples 9-13 were made in accordance with the procedures outlined in Example 1, except that different ratios of IOA/ODA were used as shown in Table 4. The adhesive transfer and peel adhesion test results are reported in Table 4.

EXAMPLES 14-17, 18C, 19 and 20C

Examples 14-17, 19 and Comparative Examples 18C, 19 and 20C were made in accordance with Example 1, except different monomeric compositions were used, as shown in Table 4. The test results are also shown in Table 4.

TABLE 4

| EX. | COMPOSITION | WT. % RATIO | ADHESIVE TRANSFER INITIAL | 1 WEEK AGING |
| --- | --- | --- | --- | --- |
| 9 | IOA/ODA | 90/10 | 1-2 | 1-2 |
| 10 | IOA/ODA | 80/20 | 1-2 | 1-2 |
| 11 | IOA/ODA | 70/30 | 1-2 | 1-2 |
| 12 | IOA/ODA | 60/40 | 1-2 | 1-2 |
| 13 | IOA/ODA | 50/50 | 1-2 | 1-2 |
| 14 | BA/ODA | 70/30 | 1-2 | 1-2 |
| 15 | BA/ODA | 60/40 | 1-2 | 1-2 |
| 16 | BA/ODA | 50/50 | 1-2 | 1-2 |
| 17 | IOA/LMA | 70/30 | 1-2 | 1-2 |
| 18C | IOA/OA | 70/30 | 4 | 4 |
| 19 | IOA/ODMA | 70/30 | 1-2 | 1-2 |
| 20C | IOA/OACM | 70/30 | 4 | 4 |

EXAMPLES 21-22

Example 21 was made in the same manner as Example 4, except that the adhesive contained 0.5% 4-acryloyl-oxybenzophenone and the adhesive was coated at a width of 1.2 cm. Example 22 was made in the same manner as Example 21, except that 0.25% by weight of the colorant Intraplast Red GC was added to the adhesive composition to make a homogenous red solution prior to drying the polymer. The samples were tested and the results are shown in Table 5.

TABLE 5

| EX. | ADHESIVE TRANSFER | PEEL (g/1.2 cm) |
| --- | --- | --- |
| 21 | 1-2 | 15 |
| 22 | 1-2 | 11 |

EXAMPLE 23

This example was prepared in the following manner:
In a 500 ml four-necked reaction vessel, equipped with a stirrer, thermometer, condensor and thermowatch, 84.0 grams of IOA, 75 grams of ODA (@48% solids in ethyl acetate), 121 grams of ethyl acetate, and 0.92 gram of ABP (@26% solids in ethyl acetate), and solution of 0.36 gram VAZO 64 in 20 grams of ethyl acetate were charged. The solution in the reaction vessel was then purged with argon to create an inert atmosphere. The solution in the reaction vessel was then heated to 55° C. for 20 hours. A 98-99% conversion was obtained. The mixture was then coated from solution onto a light weight, unprimed paper. A dry coating thickness of 0.8 to 1.0 mil of the adhesive solution was obtained.

The coated paper was then adhered, as specified in the above removability test, to two different test substrates: one being an 100 mm thick untreated poly(ethylene terephthalate) sheet ("PET", commercially available as PP2410 from Minnesota Mining and Manufacturing Company) the second being a 100 mm thick sheet of poly(ethylene terephthalate) film surface treated with hydrolyzed cellulose acetate ("treated PET", commercially available as GC3120 from Minnesota Mining and Manufacturing Company). Removability was the measured for samples from both test substrates after dwell of one day and one week.

TABLE 8

| | | | REMOVABILITY | | |
| --- | --- | --- | --- | --- | --- |
| | | Wt. % | PET | | treated PET |
| Ex. | Composition | ratio | 1 day | 1 week | 1 day | 1 week |
| 23 | IOA/ODA/ABP | 70/30/0.2 | good | good | good | good |

COMPARATIVE EXAMPLES 24C-25C

Comparative Examples 24C-25C were made in accordance with Example 23. The weight ratios in the Comparative Examples were outside the ranges claimed and are reported in Table 9. Removability test results are also reported in Table 9.

TABLE 9

| | COMPOSITION | Wt. % | REMOVABILITY | | | |
| --- | --- | --- | --- | --- | --- | --- |
| | | | PET | | TREATED | |
| EX. | | Ratio | 1 DAY | 1 WEEK | 1 DAY | 1 WEEK |
| 24C | IOA/ODA/ABP | 40/60/0.2 | TEAR | TEAR | TEAR | TEAR |
| 25C | IOA/ODA/ABP | 30/70/0.2 | WEAK | WEAK | WEAK | WEAK |

As can be seen, Comparative Examples 24C and 25C illustrate unacceptable removability properties.

In summary, a novel and unobvious imaging manifold together with a method of making imaging manifold has been described. Although specific embodiments and examples have been described herein, it should be borne in mind that these have been provided by way of explanation and illustration and that the present invention is not limited thereby. Certainly modifications which are within the ordinary skill in the art are considered to lie within the scope of this invention as defined by the following claims including all equivalents.

We claim:

1. An imaging manifold comprising:
   a. a transparent, polymeric sheet imageable in an imaging device;
   b. an opaque backing sheet underlying and in register with said transparent sheet; and
   c. a removable adhesive composition adhering said opaque backing sheet to said transparent sheet wherein said adhesive comprises:
      1. from about 50 to about 90 percent by weight of one or more lower alkyl acrylates having an alkyl group comprising from 4 to 12 carbon atoms;
      2. from about 10 to about 50 percent by weight of one or more higher alkyl acrylates having an alkyl group comprising from 12 to 26 carbon atoms wherein said lower and higher alkyl acrylates do not simultaneously have 12 carbon atoms; and
      3. effective amount of a photocrosslinker to substantially prevent adhesive transfer wherein said adhesive composition permits the removal of said opaque backing sheet from said transparent sheet said adhesive composition having a greater affinity for the opaque backup sheet than for the transparent sheet.

2. The imaging sheet manifold of claim 1 wherein said alkyl group of said lower alkyl acrylate has from about 4 to about 8 carbon atoms and is linear.

3. The imaging manifold of claim 1 wherein said higher alkyl acrylate's alkyl group comprises from 13 to 18 carbon atoms.

4. The imaging manifold of claim 1 wherein said photocrosslinker is selected from the group consisting of benzophenone, mono-ethylenically unsaturated aromatic ketones and chromophore substituted halomethyl-s-triazines.

5. The imaging manifold of claim 1 wherein said adhesive further comprises a colorant.

6. The imaging manifold of claim 1 wherein said adhesive is interposed in a straight line between said opaque backing and said transparent sheet.

7. The imaging manifold of claim 1 wherein said adhesive is interposed in a dotted line between said opaque backing and said transparent sheet.

8. The imaging manifold of claim 1 wherein said transparent, polymeric sheet is made of polyester.

9. The imaging manifold of claim 1 wherein said adhesive composition comprises from about 60 to about 80% by weight of said lower alkyl acrylate; from about 20 to about 40% by weight of said higher alkyl acrylate; and from about 0.05 to about 1.0% by weight of said crosslinker.

10. The imaging manifold of claim 9 wherein said crosslinker comprises from about 0.2 to about 0.4% by weight of said adhesive.

11. The imaging manifold of claim 9 wherein said alkyl group of said higher alkyl acrylate comprises from 13 to 18 carbon atoms.

12. The imaging manifold of claim 9 wherein said crosslinker is acryloyl-oxy-benzophenone.

* * * * *